(12) United States Patent
Suzuki

(10) Patent No.: US 8,595,474 B2
(45) Date of Patent: Nov. 26, 2013

(54) INFORMATION PROCESSING APPARATUS AND BRANCH PREDICTION METHOD

(75) Inventor: Takashi Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 765 days.

(21) Appl. No.: 12/780,131

(22) Filed: May 14, 2010

(65) Prior Publication Data

US 2010/0306516 A1 Dec. 2, 2010

(30) Foreign Application Priority Data

Jun. 1, 2009 (JP) ................................. 2009-132297

(51) Int. Cl.
*G06F 9/38* (2006.01)

(52) U.S. Cl.
USPC .......................................... 712/240; 712/241

(58) Field of Classification Search
None
See application file for complete search history.

(56) References Cited

U.S. PATENT DOCUMENTS

| 5,175,827 | A  | * | 12/1992 | Morisada ...................... | 712/240 |
| 5,506,976 | A  | * | 4/1996  | Jaggar ......................... | 712/238 |
| 5,937,203 | A  | * | 8/1999  | Lee et al. ..................... | 712/43  |
| 6,085,315 | A  | * | 7/2000  | Fleck et al. ................... | 712/241 |
| 6,757,817 | B1 | * | 6/2004  | Booth .......................... | 712/241 |
| 7,159,103 | B2 | * | 1/2007  | Ahmad et al. .................. | 712/241 |
| 7,475,231 | B2 | * | 1/2009  | Tran ............................ | 712/241 |
| 7,873,820 | B2 | * | 1/2011  | Knoth .......................... | 712/241 |
| 2004/0003202 | A1 |  | 1/2004  | Ukai |  |
| 2005/0066154 | A1 |  | 3/2005  | Chung |  |
| 2006/0092712 | A1 |  | 5/2006  | Park |  |
| 2008/0082842 | A1 |  | 4/2008  | Minami |  |
| 2008/0082843 | A1 | * | 4/2008  | Schuler et al. ................ | 713/323 |
| 2009/0055635 | A1 |  | 2/2009  | Tani |  |

FOREIGN PATENT DOCUMENTS

| JP | 6-89173 | 3/1994 |
| JP | 2004-38337 | 2/2004 |
| JP | 2005-100403 | 4/2005 |
| JP | 2006-31697 | 2/2006 |
| JP | 2009-53861 | 3/2009 |

OTHER PUBLICATIONS

Office Action issued by the European Patent Office on Oct. 28, 2010 in the corresponding European patent application No. 10162770.1.

* cited by examiner

*Primary Examiner* — Eric Coleman
(74) *Attorney, Agent, or Firm* — Staas & Halsey LLP

(57) ABSTRACT

An information processor includes a first recording unit which stores first information indicating correspondence between an instruction address and a branch destination address of a most recent branch instruction, a computation of the most recent branch instruction having been completed and a branch for the most recent branch prediction having been taken, a second recording unit which stores a second information indicating correspondence between an instruction address and a branch destination address of each of past branch instructions including the most recent branch instruction, computations of the past branch instructions having been completed and branches for the past branch instructions having been taken, and a control unit which makes a branch prediction based on the first information or the second information, and stops supply of a clock to the second recording unit and makes a branch prediction based on the first information when an instruction sequence enters a loop.

7 Claims, 5 Drawing Sheets

INFORMATION PROCESSING APPARATUS AND BRANCH PREDICTION METHOD

CROSS-REFERENCE TO RELATED APPLICATIONS

This application is based upon and claims the benefit of priority of the prior Japanese Patent Application No. 2009-132297, filed on Jun. 1, 2009, the entire contents of which are incorporated herein by reference.

FIELD

Various embodiments of the present invention discussed herein relate to an information processing apparatus that makes a branch prediction.

BACKGROUND

A processor, executing a pipe-line control operation includes a branch prediction mechanism for making a prediction about an instruction branch to efficiently read instruction sequences, that is, an instruction fetch, from a memory to an instruction execution unit. Since the instruction fetch may be performed prior to execution of an instruction, the branch prediction mechanism is of great importance, especially in processors that perform out-of-order control.

In an instruction execution processing device proposed in the past, an entry of a branch history is related to an instruction address and the entry is formed by the number of blocks defined by the length of an instruction to be fetched and the minimum unit length of an instruction word.

[Patent Document 1] Japanese Laid-Open Patent Application 06-089173

[Patent Document 2] Japanese Laid-Open Patent Application 2004-38337

A reduction in power consumption, consumed during branch prediction processing, as much as possible is desirable for the branch prediction mechanism.

SUMMARY

An information processing apparatus includes a first branch history recording unit which stores first correspondence information which is correspondence information between an instruction address and a branch destination address of a most recent branch instruction, a computation of the most recent branch instruction having been completed and a branch for the most recent branch prediction having been taken; a second branch history recording unit which stores a second correspondence information which is correspondence information between an instruction address and a branch destination address of each of a plurality of past branch instructions, which includes the most recent branch instruction, computations of the plurality of past branch instructions having been completed and branches for the plurality of past branch instructions having been taken; and a branch prediction control unit which makes a branch prediction, based on a result of a search for one of the first correspondence information stored in the first branch history recording unit and the second correspondence information stored in the second branch history recording unit, with use of an instruction address of an instruction fetched from a memory, and which stops supply of a clock to the second branch history recording unit and makes a branch prediction based on the result of the search for the first correspondence information in the first branch history recording unit when an instruction sequence enters a loop.

DESCRIPTION OF EMBODIMENTS

Figure 1:
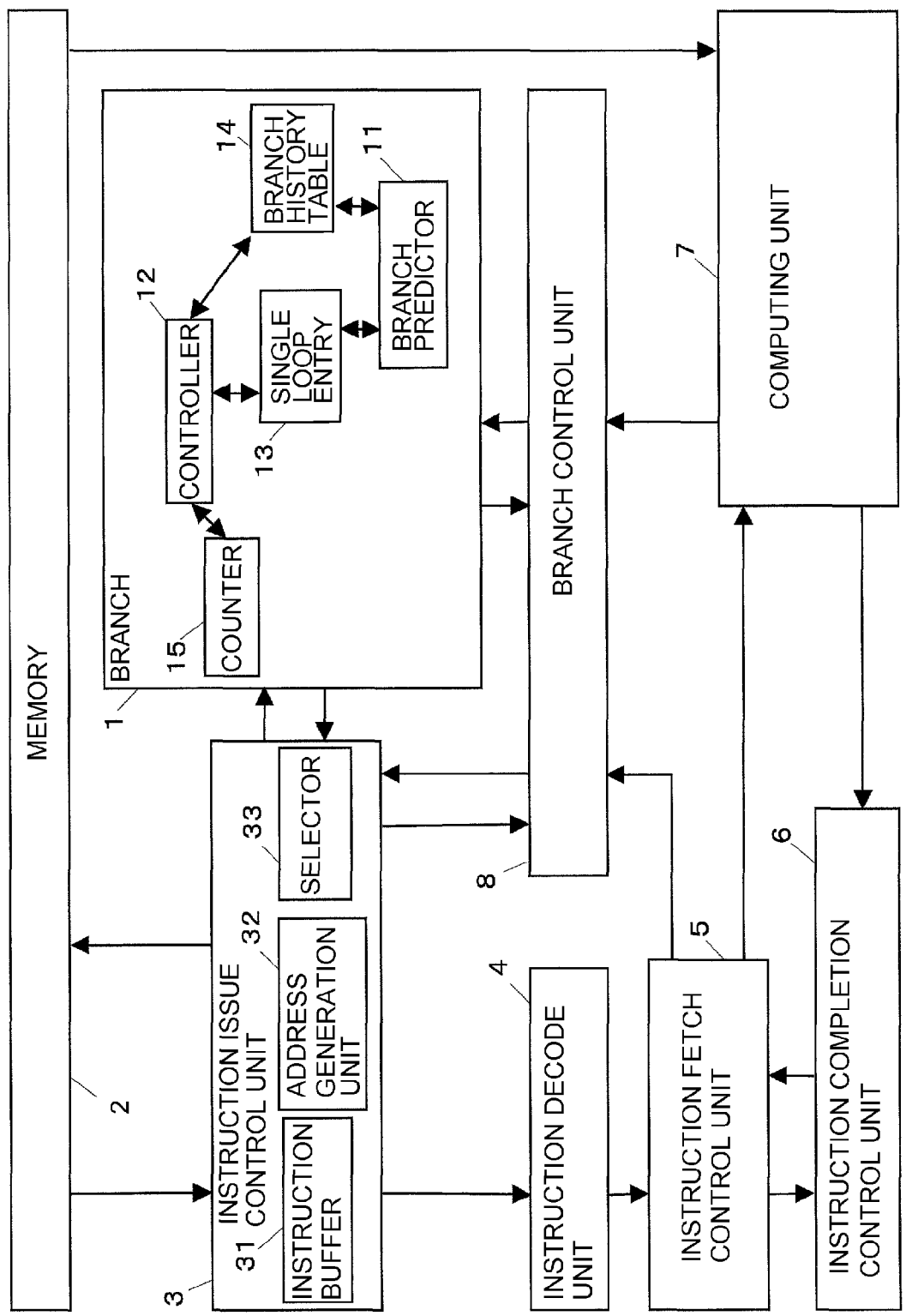
FIG. 1 illustrates a diagram indicating an example of an information processing apparatus.

To reduce power consumption incurred by a processor, stopping supply of clocks to computing resources that are not used in a given period for executing instructions, during the period where the instructions are not executed has been proposed.

The inventor of the present invention studied a branch prediction mechanism that makes a prediction of whether a fetched instruction is a branch instruction or not, by searching an entry in branch histories (hereinafter, referred to as a "branch history table"). In such a branch prediction, the more the number of entries, the higher the accuracy of branch prediction. For this reason, use of a random access memory (RAM) as the branch history table capable of storing large amount of data has been proposed. Furthermore, stopping the supply of clocks that are supplied to the computing resources, like large capacity RAM, allows a significant reduction in power consumption.

However, in the branch prediction, the branch history table is referenced each time an instruction is fetched. Moreover, such instruction fetch are frequently executed prior to execution of instructions. Therefore, it is assumed that the branch history table is used almost all the time. In other words, since the branch history table is referenced not only for updating data but also for referencing the data, stopping the supply of clocks that are supplied to the branch history table is difficult.

On the other hand, as a structure frequently seen in programs, a structure where a plurality of instructions forms a single instruction sequence exists, and this single instruction sequence or a part thereof is repeatedly executed. Hereinafter, the repeated execution of a single instruction sequence or the repeated execution of a portion of the single instruction sequence is referred to as "an instruction enters a loop" or "an instruction goes into a loop" and the plurality of instructions repeatedly executed is referred to as a "loop." On the other hand, when the repeated execution of the instruction sequence, once having entered the loop, is brought to a stop, this is referred to as "the instruction is taken out of the loop."

The inventor of the present invention studied the following instruction fetch control unit. This instruction fetch control unit is capable of directly providing instructions from a plurality of instruction buffers and of executing instructions. Such process is achieved by repeatedly executing a plurality of instructions included in a loop by using the plurality of instruction buffers. The instruction buffers detect the branch instructions included in the loop and store the branch instructions therein. In such instruction fetch control unit, the instruction buffers store the instructions beforehand. In consequence, it is unnecessary to newly fetch the instructions from a memory. As a result thereof, the instructions stored in the instruction buffers may be directly executed. In such instruction fetch control unit, it is unnecessary to reference the branch history table. Consequently, it is thought that stopping the supply of clocks, which are supplied to the branch history table, may be achieved during a period where the instruction buffers are in use.

However, according to the instruction fetch control unit as mentioned above, it is unable to achieve a loop only by using the instruction buffers if the number of instructions included in the loop exceeds the number of prepared instruction buffers. In other words, the supply of clocks to the branch history table may be stopped when executing a loop having a length capable of being stored in the prepared instruction buffers. Due to this, the opportunity of reducing the power is limited.

According to an information processing apparatus illustrated in FIG. 1, hereinafter disclosed, power consumption in execution of the branch prediction processing may be reduced regardless of the lengths of the loops of the instruction sequences.

FIG. 1 illustrates a diagram that indicates an example of an information processing apparatus according to an embodiment of the invention.

The information processing apparatus in FIG. 1 includes a branch prediction unit 1, a memory 2, an instruction fetch control unit 3, an instruction decode unit 4, an instruction issue control unit 5, an instruction completion control unit 6, a computing unit 7, and a branch control unit 8. The information processing apparatus in FIG. 1 is a computer that executes computations based on, for example, a superscalar method and an out-of-order control method. For this reason, the information processing apparatus in FIG. 1 includes a branch prediction mechanism. This branch prediction mechanism includes the branch prediction unit 1, the instruction fetch control unit 3, and the branch control unit 8.

The branch prediction unit 1 performs branch prediction processing. The branch prediction processing is a type of processing that makes a prediction of whether an instruction that is fetched from the memory 2 by the instruction fetch control unit 3 causes a branch to be taken or not. The branch prediction unit 1 includes a branch predictor 11, a controller 12, a single loop entry 13, a branch history table 14, and a counter 15.

The branch predictor 11 executes the branch prediction processing by use of the single loop entry 13 or by use of the branch history table 14, and sends a result of the branch prediction processing to the branch control unit 8. The branch predictor 11 acquires an instruction fetch address from the instruction fetch control unit 3, searches the single loop entry 13 or the branch history table 14 by using the acquired instruction fetch address, and executes the branch prediction processing. The branch predictor 11 makes a branch prediction based on a result of the search for first correspondence information in the single loop entry 13 or for second correspondence information in the branch history table 14 by use of an instruction address of the instruction that is fetched from the memory 2. The instruction fetch address is an address of the instruction that is fetched from the memory 2 by the instruction fetch control unit 3.

The single loop entry 13 is a branch history recoding part that stores a single piece of the first correspondence information. The first correspondence information indicates a correspondence between an instruction address and a branch destination address of a most recent branch instruction, the branch for which has been taken.

The single loop entry 13 stores only a single piece of the correspondence information that indicates a correspondence between the instruction address and the branch destination address of the branch instruction. In other words, only a single entry resides in the single loop entry 13.

For example, a flip-flop circuit is used as the single loop entry 13. More specifically, the flip-flop circuits, the number of which is equal to the number of bits of the single entry, are prepared as the single loop entry 13. Since the number of entries that is stored in the single loop entry 13 is single, the single loop entry 13 does not include a peripheral circuit(s), such as, an address decoder or the like. For this, power consumption of the single loop entry 13 is low in comparison with that of the branch history table 14 having a plurality of entries and provided with the peripheral circuit(s).

The branch history table 14 is a branch history recoding part that stores the plurality pieces of second correspondence information. The second correspondence information is correspondence information that indicates a correspondence between an instruction address and a branch destination address of each of branch instructions, the branch of each of which has been taken in the past.

The branch history table 14 stores histories of the plurality pieces of the correspondence information each indicating a correspondence between the instruction address (hereinafter, referred to as a "branch instruction address") and the branch destination address of the branch instruction, the branch of which has been taken. In other words, a plurality of entries that includes the first correspondence information stored in the single loop entry 13 resides in the branch history table 14.

For example, a static random access memory (SRAM) is used as the branch history table 14. Since the branch history table 14 stores the plurality of entries, circuit size thereof is larger than that of the single loop entry 13 whose entry is single. Moreover, the branch history table 14 includes the peripheral circuits such as a write circuit, a read circuit, an address decoder or the like. Although it depends on the number of entries, power consumption of the branch history table 14 is higher that that of the single loop entry 13. For example, power consumption of the branch history table 14 is several hundreds of times to several tens of thousands times greater than that of the single loop entry 13.

The branch predictor 11 searches the branch history table 14 during a normal operation mode. The normal operation mode is a type of operation mode where the clocks are supplied to the branch history table 14. The branch predictor 11 receives a report indicating that the operation mode has been switched to the normal operation mode from a reduced power consumption mode from the controller 12, and executes the processing for the normal operation mode.

The branch predictor 11 searches the single loop entry 13 during the reduced power consumption mode. The reduced power consumption mode is a type of operation mode where the clocks are not supplied to the branch history table 14. Consequently, the branch history table 14 is placed in a "stopped state" during the reduced power consumption mode. The branch predictor 11 receives a report indicating that the operation mode has been switched from the normal operation mode to the reduced power consumption mode from the controller 12, and executes the processing for the reduced power consumption mode.

During the normal operation mode, the branch predictor 11 compares the instruction fetch address acquired from the instruction fetch control unit 3 with the branch instruction address included in the second correspondence information in the branch history table 14, and determines whether or not there is an entry in which both address coincide with each other.

Thereafter, when an entry in which the instruction fetch address coincides with the branch instruction address included in the second correspondence information exists, the branch predictor 11 makes a prediction that the instruction read from the instruction fetch address is a branch instruction and that a branch is taken for the branch instruction. In response to the prediction that the branch is taken, the branch predictor 11 identifies a branch destination address which is included in the second correspondence information in the entry in which the both addresses coincide with each other and is related to the branch instruction address. In other words, the branch predictor 11 reads the branch destination address corresponding thereto, from the branch history table 14.

Thereafter, the branch predictor 11 sends a result of the prediction that the branch is taken and the identified branch destination address to the branch control unit 8, as a result of the branch prediction processing. In addition, the branch predictor 11 sends a given control signal and the identified branch destination address to the instruction fetch control unit 3, as the result of the branch prediction processing. The instruction fetch control unit 3 receives the branch destination address sent from the branch predictor 11, and uses the received branch destination address as an instruction address to be fetched next.

When there is no entry in which the instruction fetch address coincides with the branch instruction address included in the second correspondence information, the branch predictor 11 makes a prediction that the instruction read from the instruction fetch address is not the branch instruction, or that although the instruction read from the instruction fetch address is the branch instruction, and a branch is not taken for the branch instruction. The branch predictor 11 sends the result of the prediction to the branch control unit 8.

During the reduced power consumption mode, the branch predictor 11 compares the instruction fetch address with a branch instruction address included in the first correspondence information in the single loop entry 13 and determines whether or not the both addresses coincide with each other.

Thereafter, when the instruction fetch address coincides with the branch instruction address included in the first correspondence information, the branch predictor 11 makes a prediction that a branch is taken. In response to the prediction that the branch is taken, the branch predictor 11 identifies a branch destination address which is included in the first correspondence information and is related to the branch instruction address. In other words, the branch predictor 11 reads the branch destination address from the single loop entry 13.

Thereafter, the branch predictor 11 sends the result of the prediction that the branch is taken and the identified branch destination address to the branch control unit 8, as the result of the branch prediction processing. In addition, the branch predictor 11 sends the given control signal and the identified branch destination address to the instruction control unit 3, as the result of the branch prediction processing. The instruction fetch control unit 3 receives the branch destination address sent from the branch predictor 11, and uses the received branch destination address as the instruction address which is fetched next.

When the instruction fetch address does not coincide with the branch instruction address included in the first correspondence information, the branch predictor 11 makes a prediction that the instruction read from the instruction fetch address is not the branch instruction, or that although the instruction read from the instruction fetch address is the branch instruction, and a branch is not taken for the branch instruction. The branch predictor 11 sends this prediction to the branch control unit 8, as the result of the branch prediction processing.

The controller 12 supplies the clocks to the branch history table 14 and to the single loop entry 13 during the normal operation mode. The supplied clocks are used as operating clocks by the branch history table 14 and the single loop entry 13.

During the reduced power consumption mode, the controller 12 supplies the single loop entry 13 with the clocks, and on the other hand, the controller 12 stops the supply of clocks to the branch history table 14. The supply of clocks allows the single loop entry 13 to operate and only the first correspondence information is repeatedly used during the reduced power consumption mode. Consequently, the branch history table 14 is not referenced, and adding the second correspondence information to the branch history table 14 is unnecessary. Therefore, even if the supply of clocks to the branch history table 14 stops, this does not affect the branch prediction processing.

Moreover, the controller 12 includes the counter 15, and performs processing associated with registration and update of a value counted by the counter 15 (hereinafter, referred to as a "count value"). The controller 12 compares an instruction address of a branch instruction, the computation of which has been completed by the computing unit 7, with the branch instruction address included in the first correspondence information in the single loop entry 13. This allows the controller 12 to increment the count value of the counter 15 each time the instruction address of the branch instruction, the computation of which has been completed, coincides with the branch instruction address included in the first correspondence information.

Thereafter, the controller 12 makes a determination of whether the count value of the counter 15 exceeds a threshold value or not. The threshold value for the count value is specified beforehand, and determined on an empirical basis for example. Use of the threshold value for the count value makes it possible to determine timing of switching the operation mode of the branch prediction mechanism from the normal operation mode to the reduced power consumption mode.

When the count value of the counter 15 exceeds the threshold value, the controller 12 determines that an instruction sequence enters a loop. When the number of loops of an instruction sequence that undergoes the computation exceeds the threshold value, the controller 12 stops the supply of clocks to the branch history table 14. This causes the operation mode of the branch prediction mechanism to be switched to the reduced power consumption mode from the normal operation mode. The controller 12 reports the branch predictor 11 that the operation mode has been switched to the reduced power consumption mode from the normal operation mode.

Note that when the number of loops of the instruction sequence does not exceed the threshold value, the supply of clocks to the branch history table 14 is not stopped. In other words, only when the number of loops of the instruction sequence exceeds the threshold value, it is determined that an instruction sequence enters a loop, in terms of the supply of clocks to the branch history table 14.

In response to switching the operation mode to the reduced power consumption mode from the normal operation mode, the branch predictor 11 makes a branch prediction based on the search result of first correspondence information in the single loop entry 13, without searching the second correspondence information in the branch history table 14. The controller 12 and the branch predictor 11 corresponds to an example of a controller that makes the branch prediction.

Furthermore, during the reduced power consumption mode, in other words, when the supply of clocks to the branch history table 14 is stopped, the controller 12 compares the instruction address of the branch instruction the computation of which has been completed with the branch instruction address included in the first correspondence information in the single loop entry 13. When the addresses do not coincide with each other, it is determined that an instruction sequence that undergoes the computation has been taken out of the loop. In response to the determination that the instruction sequence has been taken out of the loop, the controller 12 supplies the branch history table 14 with the clocks. This allows the operation mode of the branch prediction mechanism to be switched to the normal operation mode from the reduced power consumption mode. When the instruction sequence has been taken out of the loop, the controller 12 updates the first correspondence information in the single loop entry 13 and clears the count value of the counter 15. The controller 12 reports to the branch predictor 11 that the operation mode has been switched to the normal operation mode from the reduced power consumption mode.

Note that there is a case where a plurality of loops occur by a single instruction sequence. In the above case, for example, upon the instruction sequence being taken out of an initial loop, the first correspondence information in the single loop entry 13 is updated and the count value of the counter 15 is cleared. Thereafter, upon a start of a next loop of the instruction sequence, the first correspondence information in the single loop entry 13 is referenced and the count value of the counter 15 is incremented.

In addition, the controller 12 receives information that indicates whether the branch prediction has resulted in success or in failure and a result of the determination of whether the branch has been taken or not from the branch control unit 8. More specifically, the controller 12 receives the branch instruction address of the instruction in which the computation has been completed, and the branch destination address, the computation of which has been completed, from the branch control unit 8, as information indicating that the branch has resulted in success. The controller 12 relates the received branch instruction address to the received branch destination address to pair them, stores the pair the first correspondence information for the single loop entry 13 and as the second correspondence information for the branch history table 14. Furthermore, the controller 12 updates the first correspondence information in the single loop entry 13 or the second correspondence information in the branch history table 14, based on the information indicating whether the branch prediction is succeeded or failed and based on the determination result of whether the branch has been taken or not.

Note that it is also possible to configure the controller 12 such that the controller 12 determines that an instruction sequence does not enter a loop when a branch has failed. Moreover, it is yet possible to configure the controller 12 to determine that an instruction sequence does not enter a loop when a branch has succeeded and the branch destination address included in the first correspondence information in the single loop entry 13 does not coincide with the branch destination address of the branch instruction in which the computation has been completed. The controller 12 clears the count value of the counter 15 when the controller 12 determines that the instruction sequence does not enter the loop.

The counter 15 counts the number of coincidences between the instruction address of the instruction in which the computation has been completed, and the branch instruction address included in the first correspondence information in the single group entry 13. The first correspondence information stored in the single loop entry 13 is not updated during a period in which the count value of the counter 15 is incremented, that is to say, during a period in which the instruction sequence, which is subject to the computation by the computing unit 7, enters the loop. Therefore, the first correspondence information stored in the single loop entry 13 is single regardless of the length of the loop of the instruction sequence.

The instruction fetch control unit 3 fetches the instructions from the memory 2. The memory 2 is a memory unit that stores instructions and data necessary for executing the instructions. The instructions to be fetched are any of the plurality of instructions included in the instruction sequence that are computed by the computing unit 7.

The instruction fetch control unit 3 includes an instruction buffer 31, an address generation unit 32, and a selector 33. The instruction buffer 31 stores the fetched instructions. The instruction fetch control unit 3 sends the address of the instruction that is fetched to the branch prediction unit 1 and to the branch control unit 8. The address generation unit 32 generates an instruction address following a current instruction fetch address. The selector 33 acquires the branch destination address, from the branch predictor 11 of the branch prediction unit 1. The selector 33 selects the branch destination address acquired from the branch predictor 11 when it is predicted that a branch is taken. On the other hand, the selector 33 selects the instruction address generated by the address generation unit 32 when it is predicted that the branch is not taken. The instruction fetch control unit 3 uses the address selected by the selector 33 as an instruction address which is fetched next from the memory 2.

Note that, as will be disclosed later in detail with reference to FIG. 4, the branch control unit 8 makes a determination of whether the branch prediction at the instruction fetch is correct or not, as a result of the branch instruction computation executed by the computing unit 7. When the branch prediction failed, it is because that the processing in relation to the predicted instruction sequence is unnecessary, that is, the prediction is false. Consequently, it is necessary to fetch a correct instruction sequence from the memory 2 and to perform the processing again.

The address generation unit 32 generates an instruction address that follows the address of an instruction next to the instruction address of the branch instruction, for which the branch prediction has failed and the computation of which has been completed by the computing unit 7, as an instruction re-fetch address in a case where the branch prediction is failed. When the branch prediction that the branch is not taken failed and the result of the computation indicates that the branch is taken, the selector 33 selects the branch destination address obtained as a result of the computation made by the instruction computing unit 7. On the other hand, when the branch prediction that the branch is taken failed and the result of the computation indicates that the branch is not taken, the selector 33 selects the instruction address generated by the address generation unit 32.

The instruction decode unit 4 reads an instruction from the instruction buffer 31 of the instruction fetch control unit 3 and decodes the read instruction. A result of decoding the instruction includes a piece of information that indicates whether or not the instruction is the branch instruction. The instruction decode unit 4 sends a result of decoding the instruction and the decoded instruction to the instruction issue control unit 5.

The instruction issue control unit 5 issues the decoded instruction and sends the decoded result of the instruction to the computing unit 7. In addition, the instruction issue control unit 5 sends information that identifies the instruction issued for the computing unit 7 to the instruction completion control unit 6. Moreover, the instruction issue control unit 5 sends a control signal that activates the branch control unit 8 to the branch control unit 8 when the decoded instruction is the branch instruction. The branch control unit 8 received the control signal starts its operation.

The instruction issue control unit 5 controls an upper limit number of instructions issued to the computing unit 7. The instruction issue control unit 5 increments the number of instructions issued to the computing unit 7 by one (+1) each time the instruction is issued to the computing unit 7. The instruction issue control unit 5 does not issue the instruction to the computing unit 7 when the number of instructions issued to the computing unit 7 exceeds the upper limit number. Consequently, the instruction issue control unit 5 is capable of controlling the number of instructions issued to the computing unit 7 so that the number of issued instructions does not exceed the upper limit number.

The instruction issue control unit 5 decrements the number of instructions issued to the computing unit 7 by one (−1) upon receipt of a report indicating that execution of the instruction has been completed, from an instruction completion control unit 6 disclosed below. As a result thereof, the computing unit 7 is brought into a state capable of receiving the instruction issued from the instruction issue control unit 5.

Upon receipt of a computation completion report from the computing unit 7, the instruction completion control unit 6 determines whether a computation of the instruction has been completed or not, based on the information for identifying the instruction having been sent from the instruction issue control unit 5. In response to completion of execution of the instruction, the instruction completion control unit 6 reports that the execution of the instruction has been completed to the instruction issue control unit 5.

The computing unit 7 executes a given computation with respect to the instruction sequence that includes the plurality of instructions. For example, the computing unit 7 receives the instruction issued by the instruction issue control unit 5 and reads data necessary for executing the computation of the received instruction from the memory 2. The computing unit 7 executes the given computation based on the received instruction and the data read from the memory 2. When a result of decoding performed by the instruction decode unit 4 indicates that the instruction is a branch instruction, the computing unit 7 computes a branch condition and a branch destination address of the branch instruction and sends a result of the computation to the branch control unit 8.

The branch control unit 8 receives the computation result from the computing unit 7 and sends the branch instruction address of instruction in which the computation has been completed, and the branch destination address, the computation of which has been completed, to the controller 12 of the branch prediction unit 1. In addition, the branch control unit 8 receives the computation result from the computing unit 7 and determines whether the result of the branch prediction processing made by the branch prediction unit 1 is correct or not, that is to say, whether the branch prediction is succeeded or failed, based on the computation result and the result of the branch prediction processing received from the branch prediction unit 1. The branch control unit 8 sends information indicating the success or the failure of the branch prediction to the controller 12 of the branch prediction unit 1.

Moreover, the branch control unit 8 sends a request to re-fetch the instruction (hereinafter, referred to as an "instruction re-fetch request") to the instruction fetch control unit 3 when the branch prediction failed.

A function of the information processing apparatus in FIG. 1 and functions of respective processing blocks included in the information processing apparatus are achieved by a CPU and programs executed on the CPU. The programs are capable of being stored in a computer readable recording media, for example, a semiconductor memory, a hard disk, a CD-ROM, a DVD or the like and supplied by being recorded on these recording media or the programs are supplied by being sent/received by use of networks through communication interfaces from the other information processing apparatus provided with these recording media storing the program.

Figure 2:
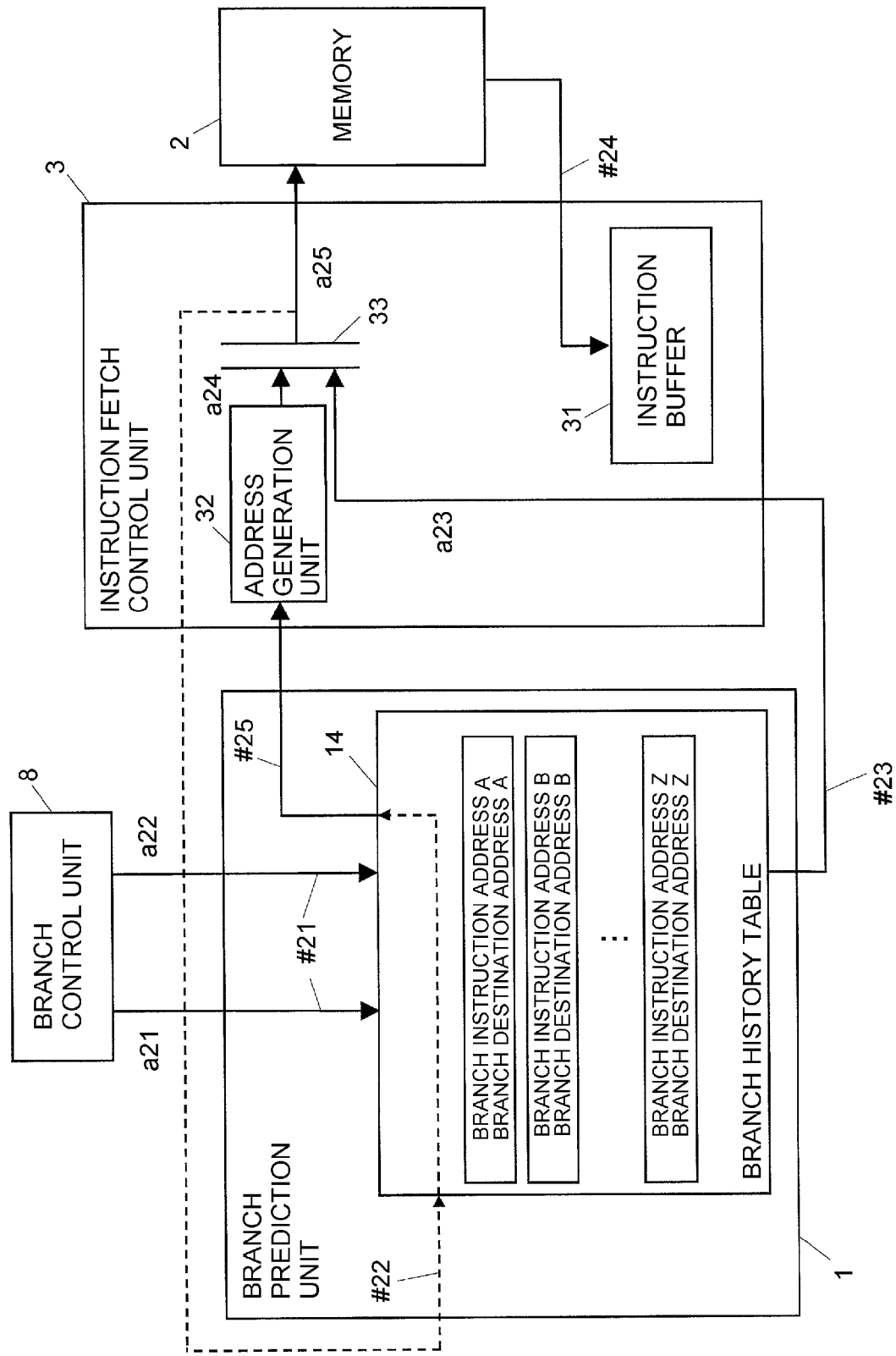
FIG. 2 illustrates a diagram explaining processing of a branch prediction unit in a normal operation mode.

FIG. 2 illustrates a diagram for explaining processing executed in the normal operation mode by the branch prediction unit 1 illustrated in FIG. 1.

The controller 12 of the branch prediction unit 1 receives an instruction address a21 (hereinafter, referred to as a "branch instruction address a21") and a branch destination address a22 of the branch instruction, the computation of which 7 has been completed by the computing unit 7, from the branch control unit 8, and registers the received branch instruction address a21 and the received branch destination address a22, as the second correspondence information, on the branch history table 14 (#21). Each time the controller 12 receives the branch instruction address a21 and the branch destination address a22 from the branch control unit 8, the controller 12 adds the received branch instruction address a21 and the received branch destination address a22, as new second correspondence information, to the branch history table 14. Note that the controller 12 of the branch prediction unit 1 updates the second correspondence information in the branch history table 14 under a given condition, as will be disclosed later with reference to FIG. 4.

Furthermore, the branch predictor 11 of the branch prediction unit 1 acquires an instruction fetch address a25 from the instruction fetch control unit 3 and searches the branch history table 14 by using the acquired instruction fetch address a25 as a key (#22).

When the instruction fetch address a25 coincides with the branch instruction address included in the second correspondence information in the branch history table 14, the branch predictor 11 makes a prediction that the instruction read from the instruction fetch address a25 is a branch instruction and a branch is taken for the branch instruction. The branch predictor 11 acquires a branch destination address related to the branch instruction address that coincides with the instruction fetch address a25 in the second correspondence information and sends the acquired branch destination address, as a predicted branch destination address a23, to the instruction fetch control unit 3 (#23).

When the prediction that a branch is taken is made by the branch predictor 11, the selector 33 receives the predicted branch destination address a23, from the branch prediction unit 1 and selects the predicted branch destination address a23, as a next instruction fetch address. The instruction fetch control unit 3 fetches an instruction from the memory 2 based on the instruction fetch address selected by the selector 33 and stores the fetched address in the instruction buffer 31 (#24).

As the result of searching the branch history table 14, when the instruction fetch address a25 does not coincides with the branch instruction address included in the second correspondence information, the branch predictor 11 makes a prediction that the instruction read from the instruction fetch address a25 is not a branch instruction or that although the instruction read from the instruction fetch address a25 is the branch instruction, a branch is not taken for the branch instruction. The branch predictor 11 directs the address generation unit 32 of the instruction fetch control unit 3 such that an address following a current instruction fetch address a25 is used as the next instruction fetch address (#25). A result of the prediction output from the branch predictor 11 is used for selecting the instruction fetch address.

The address generation unit 32 having received the direction from the branch predictor 11 generates an address a24 following the current instruction fetch address a25 and outputs it to the selector 33.

When the branch predictor 11 makes a prediction that the branch is not taken, the selector 33 selects the address a24 having been generated by the address generation unit 32 as the next instruction fetch address.

Figure 3:
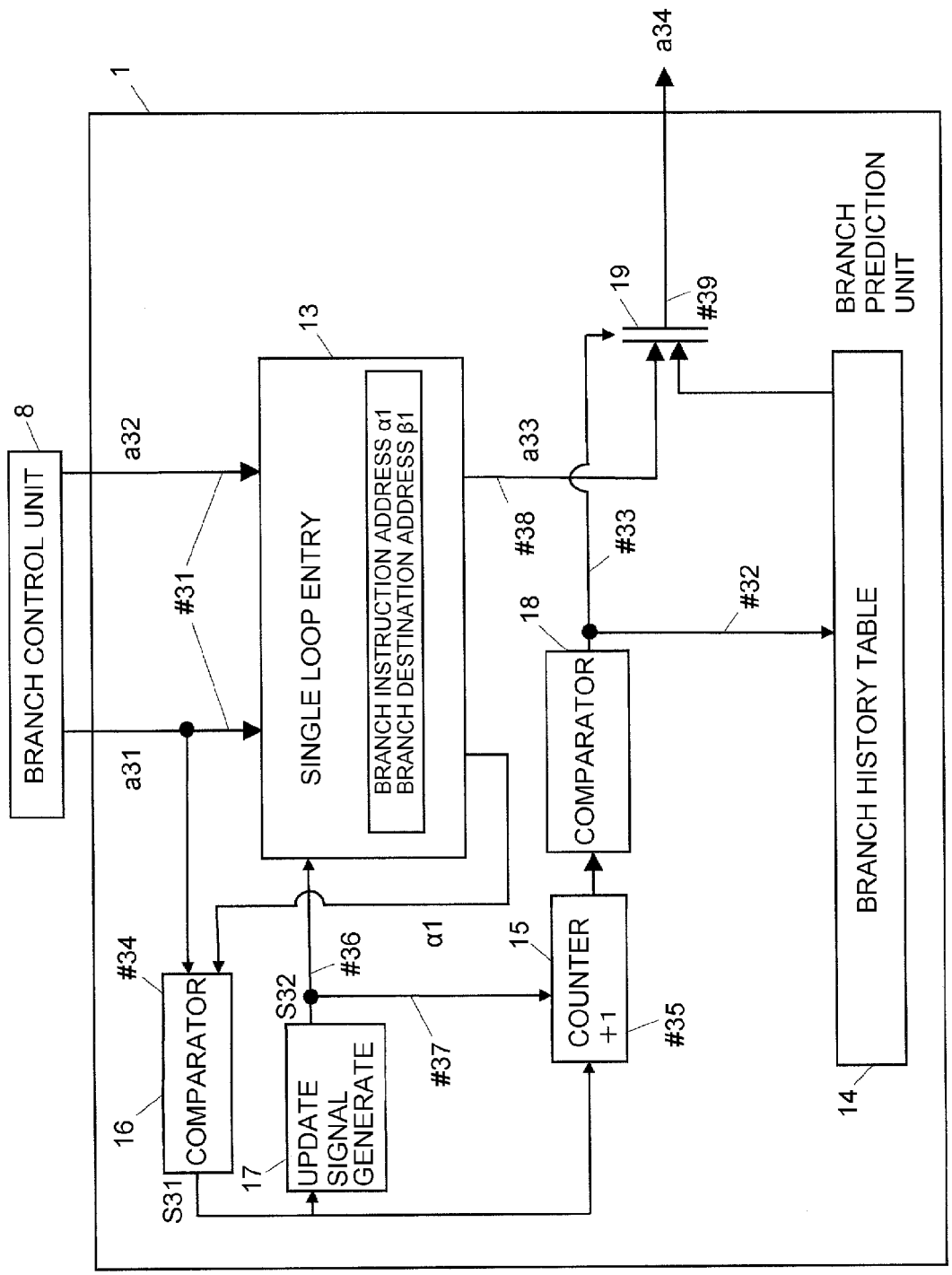
FIG. 3 illustrates a diagram explaining processing switching to a reduced power consumption mode from the normal operation mode, in the branch prediction apparatus.

FIG. 3 illustrates a diagram for explaining switching processing to the reduced power consumption mode from the normal operation mode in the branch prediction unit 1 illustrated in FIG. 1.

The controller 12 of the branch prediction unit 1 in FIG. 1 includes a comparator 16, an update signal generator 17, and a comparator 18. Moreover, the branch predictor 11 of the branch prediction unit 1 includes a selector 19.

The controller 12 of the branch prediction unit 1 receives a branch instruction address a31, the computation of which has been completed by the computing unit 7, and a branch destination address a32, the computation of which has been completed by the computing unit 7, from the branch control unit 8, and registers the received branch instruction address a31 and the received destination address a32, as the first correspondence information, on the single loop entry 13. Note that the branch instruction address a31 and the branch destination address a32 are the addresses that are the same as the branch instruction address a21 and the branch destination address a22 in Process #21.

The comparator 18 of the branch prediction unit 1 compares the count value of the counter 15 with the threshold value and makes a determination of whether the count value exceeds the threshold value or not. When the comparator 18 determines that the count value exceeds the threshold value, the controller 12 determines that the instruction sequence computed by the computing unit 7 enters a loop.

When the instruction sequence computed by the computing unit 7 enters the loop, the controller 12 stops the supply of clocks to the branch history table 14 (#32). This allows the operation mode of the branch prediction mechanism to be switched to the reduced power consumption mode from the normal operation mode. In response to that the operation mode of the branch prediction mechanism has been switched to the reduced power consumption mode, the controller 12 directs the selector 19 to select a branch destination address a33 output as the result of the search performed on the single loop entry 13 (#33).

When the count value does not exceed the threshold value as a result of the comparison by the comparator 18, the controller 12 determines that the instruction sequence computed by the computing unit 7 does not enter the loop and continues the normal operation mode. That is to say, the controller 12 directs the selector 19 to select the branch destination address output as the result of the search performed on the branch history table 14 (#33).

The selector 19 selects the branch destination address directed by the controller 12. The branch predictor 11 sends the selected branch destination address to the instruction fetch control unit 3, as a predicted branch destination address a34 (39#).

In addition, when the controller 12 receives the branch instruction address a31, the computation of which has been completed, from the branch control unit 8, the comparator 16 compares the received branch instruction address a31 with a branch instruction address alpha 1 ($\alpha1$) of the first correspondence information in the single loop entry 13 (#34).

When the received branch instruction address a31 coincides with the branch instruction address al of the first correspondence information, the comparator 16 outputs a comparison result coincidence signal S31. The comparison result coincidence signal S31 is a signal that indicates the branch instruction address a31 coincides with the branch instruction address a1. The controller 12 increments the count value of the counter 15 based on the comparison result coincidence signal S31 (#35).

When the branch instruction address a31 is non-coincident with the branch instruction address a1, the update signal generator 17 inverts the comparison result coincidence signal S31 to generate an update signal S32. The update signal S32 is a signal that directs the update of the first correspondence information in the single entry and that directs the clearing of the counter 15.

The controller 12 updates the first correspondence information in the single loop entry 13 by use of the branch instruction address a31 and of the branch destination address a32, based on the update signal S32 generated by the update signal generator 17 (#36). Moreover, the controller 12 clears the counter 15 based on the update signal S32 (#37).

The branch predictor 11 of the branch prediction unit 1 executes the branch prediction processing disclosed below in response to that the operation mode of the branch prediction mechanism has been switched to the reduced power consumption mode.

The branch predictor 11 acquires the instruction fetch address from the instruction fetch control unit 3 and searches the single loop entry 13 by using the acquired instruction fetch address as a key. When the instruction fetch address coincides with the branch instruction address al indicated by the first correspondence information stored in the single loop entry 13, the branch predictor 11 make a prediction that the instruction read from the instruction fetch address al is a branch instruction and a branch is taken for the branch instruction. The branch predictor 11 outputs a branch destination address beta 1 ($\beta1$) corresponding to the coincided branch instruction address a1, as the predicted branch destination address a33, to the selector 19 (#38).

As disclosed hereinabove, the selector 19 selects the branch destination address a33 according to the direction made by the controller 12, during the reduced power consumption mode. Then, the branch predictor 11 sends the selected branch destination address, as the predicted branch destination address a34, to the instruction fetch control unit 3 (# 39).

When the instruction sequence computed by the computing unit 7 enters the loop in the processing illustrated in FIG. 3, the branch destination address that has been predicted by use of the single loop entry 13 is selected. On the other hand, when the instruction sequence does not enter the loop, the branch destination address that has been predicted by use of the branch history table 14 is selected. With the processing disclosed hereinabove, the selected branch destination address is used for the instruction fetch by the instruction fetch control unit 3. This achieves a reduction in power consumption of the branch prediction mechanism during the execution of the loop of the instruction sequence.

Figure 4:
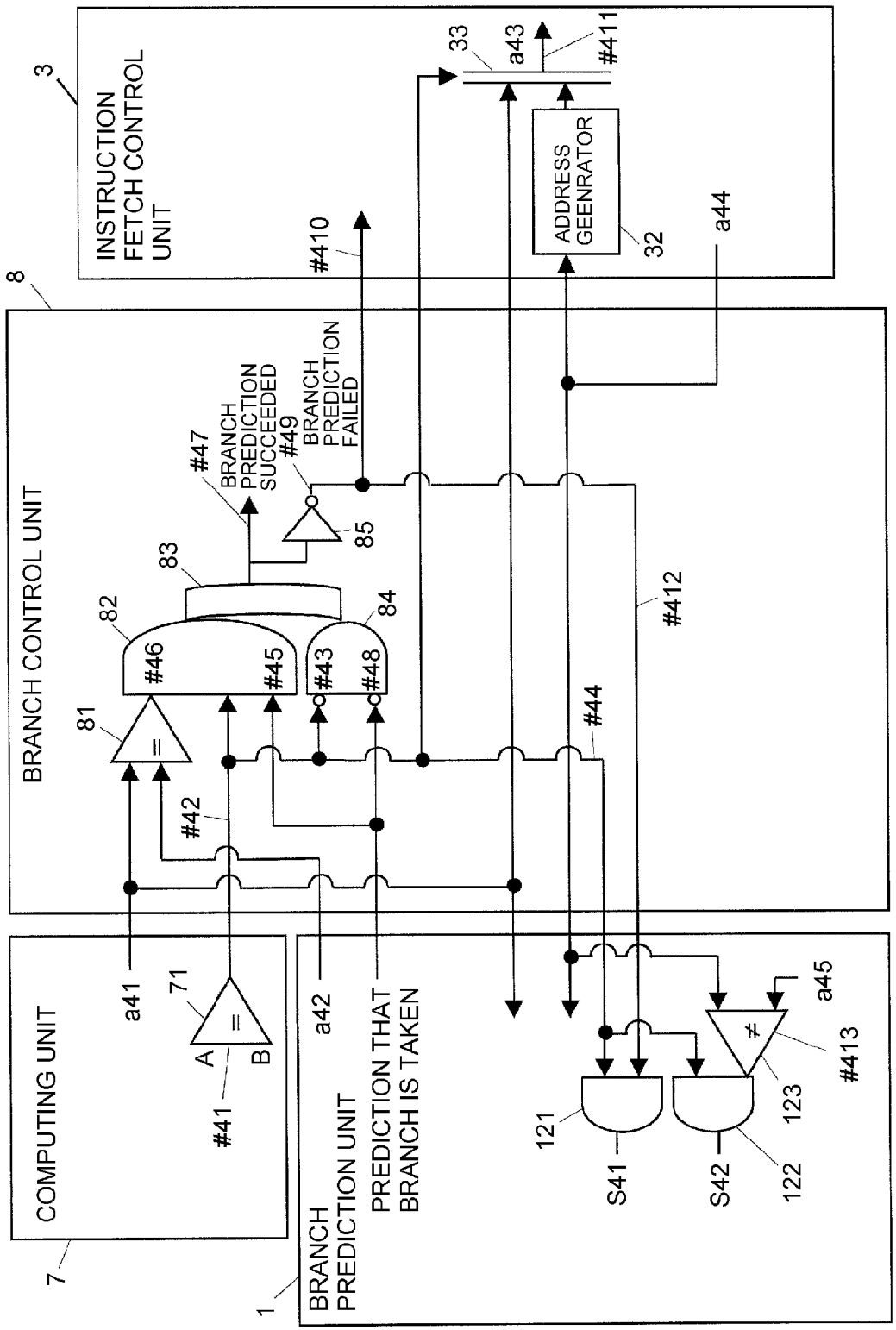
FIG. 4 illustrates a diagram explaining processing of a branch control unit.

FIG. 4 illustrates a diagram for explaining processing of the branch control unit 8.

When the instruction read from an instruction fetch address a44 is a branch instruction, the computing unit 7 computes a branch condition and a branch destination address of the branch instruction and sends a result of the computation, to the branch control unit 8. For example, with respect to the branch instruction issued by the instruction issue control unit 5, when a condition allowing a branch to be taken is that a value of a register A is equal to a value of a register B, a comparator 71 included in the computing unit 7 compares the value of the register A with the value of the register B (#41) and sends a result of the comparison to the branch control unit 8.

The branch control unit 8 compares the computed result, received from the computing unit 7, with the condition allowing the branch to be taken and makes a determination of whether the both coincide with each other. When the computed result received by the branch control unit 8 from the computing unit 7 coincides with the condition allowing the branch to be taken, the branch control unit 8 determines that a branch is taken for the branch instruction (#42).

On the other hand, when the computed result received by the branch control unit 8 from the computing unit 7 does not coincide with the condition allowing the branch to be taken, the branch control unit 8 determines that the branch is not taken for the branch instruction. More specifically, the branch control unit 8 input a result of the determination that the branch is taken for the branch instruction, to an AND circuit 84 (#43). Note that the AND circuit 84 is a logic circuit to which an inverted signal is input, in the example illustrated in FIG. 4.

The branch control unit 8 sends the determination result of whether or not the branch is taken for the branch instruction, to the controller 12 of the branch prediction unit 1. More specifically, the branch control unit 8 sends the determination result that the branch is taken for the branch instruction, to the branch prediction unit 1 to input to an AND circuit 121 of the branch prediction unit 1 (#44).

In addition, the branch control unit 8 receives a result of the branch prediction processing, from the branch prediction unit 1. More specifically, the branch control unit 8 receives a prediction of whether or not a branch is taken or not and a branch destination address a42 predicted by the branch predictor 11, from the branch predictor 11 of the branch prediction unit 1. The branch prediction unit 8 makes a determination of whether or not the branch is taken for the branch instruction, by use of a comparator 81, an AND circuit 82, an OR circuit 83, the AND circuit 84, and an inverter circuit 85 illustrated in FIG. 4. This determination processing is executed based on the result of the computation, received from the computing unit 7, and on the result of the branch prediction processing, received from the branch prediction unit 1. This determination processing is executed as disclosed in the following three (3) cases, that is, a first case to a third case, hereinafter disclosed.

The first case is a case where the branch prediction unit 1 makes a prediction that a branch is taken (#45), the branch control unit 8 determines that the branch is taken for the branch instruction (#42), and a coincidence is obtained, by the comparator 81, between a branch destination address a41, the computation of which has been completed, and the branch destination address a42, predicted by the branch prediction unit 1 (#46). In the first case, the branch control unit 8 determines that the branch prediction has resulted in success (#47).

More specifically, a result of the prediction, made by the branch prediction unit 1, that the branch is taken, a result of the determination, made by the branch control unit 8, that the branch is taken for the instruction, and a result of the determination, made by the comparator 81, are input to the AND circuit 82. In response thereto, the OR circuit 83 outputs information indicating the success of the branch prediction. The branch control unit 8 determines that the branch prediction has resulted in success, based on the information output by the OR circuit 83.

The second case is a case where the branch control unit 8 determines that the branch is not taken (#43) for the branch instruction as to which the branch prediction unit 1 has made a prediction that the branch has not been not taken for the branch instruction (#48). In the second case, the branch control unit 8 determines that the branch prediction has resulted in success (#47). More specifically, an inverted signal of the prediction result, made by the branch prediction unit 1, that the branch is taken (in other words, the prediction that the branch is not taken) and an inverted signal of the determination result, made by the branch control unit 8, that the branch is taken for the instruction (in other words, the determination that the branch is not taken) are input to the AND circuit 84. In response thereto, the OR circuit 83 outputs the information indicating the success of the branch prediction. The branch control unit 8 determines that the branch prediction has resulted in success, based on the information output by the OR circuit 83.

The third case is cases which do not fall under the first case and the second case. In the third case, the inverter circuit 85 inverts the output of the OR circuit 83 and outputs information indicating failure of the branch prediction. In response thereto, the branch control unit 8 determines that the branch prediction has resulted in failure, based on the information output by the inverter circuit 85 (#49).

The success in the branch prediction by the branch control unit 8 means that the instruction sequence previously executed is correct. Consequently, the instruction fetch control unit 3 continues its processing without change. On the other hand, the failure in the branch prediction by the branch control unit 8 means that the instruction sequence previously executed is false. In the failure case, consequently, the branch control unit 8 sends the instruction re-fetch request, to the instruction fetch control unit 3 (#410). Upon receipt of the instruction re-fetch request from the branch control unit 8, the instruction fetch control unit 3 cancels all the execution of the previously fetched instructions and re-fetches instructions of the correct instruction address, from the memory 2.

When the branch prediction by the branch control unit 8 results in failure (#49) and the branch is taken (#42), the selector 33 included in the instruction fetch control unit 3 selects the branch destination address a41, obtained as the result of the computation by the computing unit 7, as an address a43 for the instruction re-fetch (#411).

When the branch prediction by the branch control unit 8 results in failure (#49) and the branch is not taken, the selector 33 selects an instruction address next to the instruction address a44 of the branch instruction, the computation of which has been completed, as the address a43 for the instruction re-fetch (#411). More specifically, the address generation unit 32 included in the instruction fetch control unit 3 generates the instruction address next to the instruction address a44 of the branch instruction, the computation of which has been completed, by adding, for example, the given value a to the instruction address a44 of the branch instruction, the computation of which has been completed. Then, the selector 33 selects the instruction address generated by the address generation unit 32, as the address a43 for the instruction re-fetch (#411).

Next, the registration of the correspondence information on the branch history table 14 or on the single loop entry 13 or the update of the correspondence information by the branch prediction unit 1 will be disclosed.

The controller 12 included in the branch prediction unit 1 includes the AND circuit 121, an AND circuit 122, and a comparator 123. The branch prediction unit 1 registers the correspondence information on the branch history table 14 or on the single loop entry 13 by use of the AND circuit 121, the AND circuit 122, and the comparator 123 or updates the registered correspondence information.

When the branch prediction by the branch control unit 8 results in failure (#49) and the branch is taken (#42), a result of the determination indicating the failure of the branch prediction and a result of the determination indicating that the branch is taken are input to the AND circuit 121 (#412 and #44). The AND circuit 121 outputs a branch history table registration signal S41. The branch history table registration signal S41 is a control signal by which registration of the correspondence information on the branch history table 14 is directed. The controller 12 of the branch prediction unit 1 registers the correspondence information that includes the branch destination address of the instruction determined to cause a branch, on the branch history table 14, based on the branch history table registration signal S41.

When the branch prediction by the branch control unit 8 results in failure and the branch is not taken, the controller 12 of the branch prediction unit 1 makes a determination of whether a given condition for updating or deleting the entry in the branch history table 14 is satisfied or not. The given condition includes, for example, that the number of times of failure in the branch prediction as to the entry is equal to or greater than the number of times determined beforehand. The controller 12 updates or deletes the entry in the branch history table 14 when the given condition for updating or deleting the entry of the branch history table 14 is satisfied.

Moreover, when the branch control unit 8 determines that the branch is taken (#42), the determination result is input to the AND circuit 122 (#44). The comparator 123 compares the instruction address a44 of the branch instruction, the computation of which has been completed, with the branch instruction address indicated by the first correspondence information in the single loop entry 13 (#413). The comparator 123 outputs information indicating that the instruction fetch address a44 does not coincide with the branch instruction address indicated by the first correspondence information, to the AND circuit 122. The AND circuit 122 outputs a single loop entry update signal S42, based on a result of the determination made by the branch control unit 8, that the branch is taken and on a result of the output by the comparator 123. The single loop entry update signal S42 is a control signal by which the update of the first correspondence information in the single loop entry 13 is directed. The controller 12 updates the first correspondence information in the single loop entry 13 by use of the instruction address of the branch instruction, the computation of which has been completed, and the branch destination address corresponding to the instruction address, based on the single loop entry update signal S42.

Figure 5:
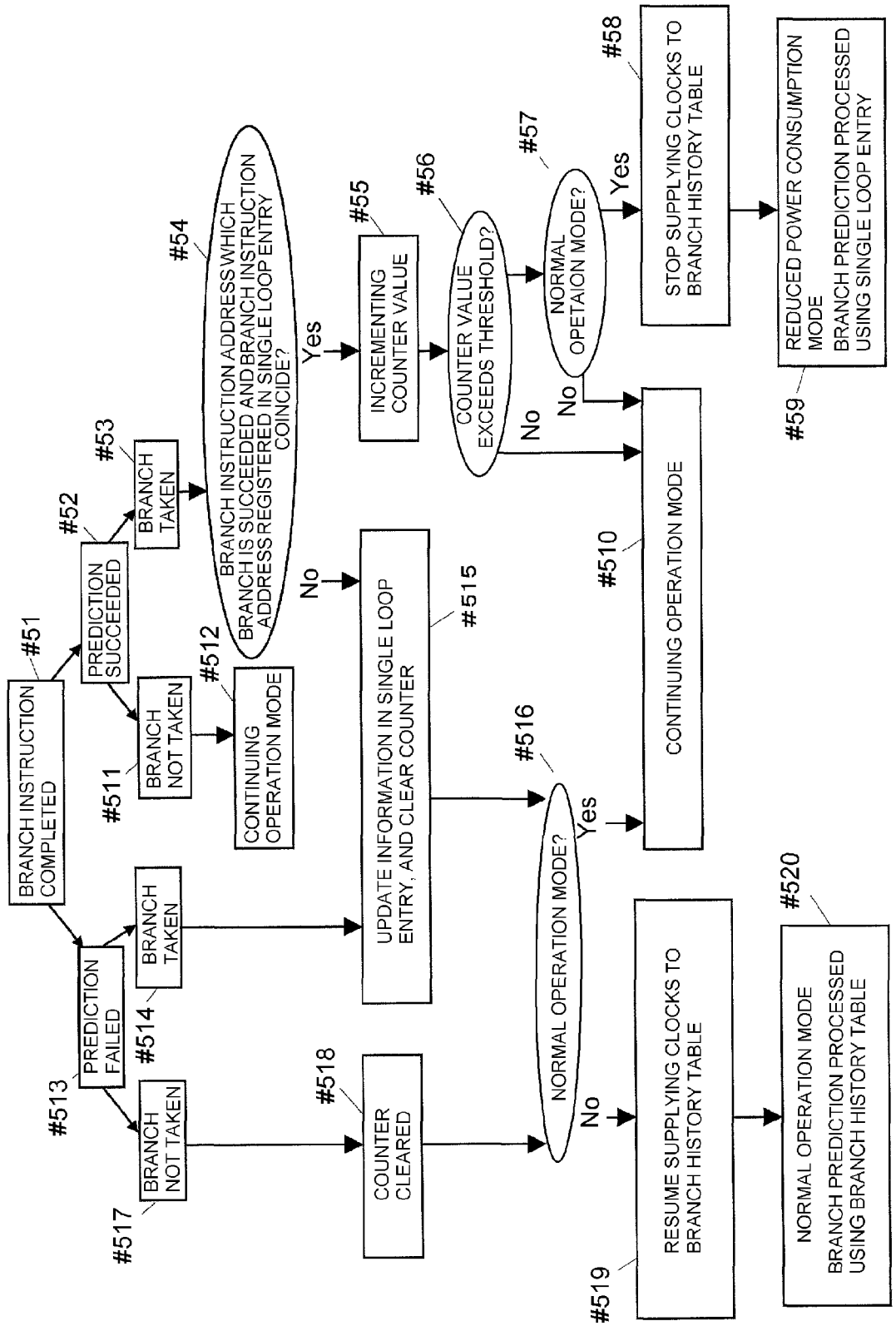
FIG. 5 illustrates a diagram explaining transition between states in a branch prediction processing operation in response to a success or a failure of branch prediction.

FIG. 5 illustrates a diagram for explaining transition between states in a branch prediction processing operation in response to the success or the failure of the branch prediction.

Assume that the computing unit 7 completes the computation of the branch instruction (#51). When the branch control unit 8 determines that a branch prediction results in success (#52) and a branch is taken (#53), the controller 12 of the branch prediction unit 1 compares a branch instruction address for which the branch has been taken, with a branch instruction address registered on the single loop entry 13 and makes a determination of whether the both coincide with each other (#54).

When the branch instruction address for which the branch has been taken does not coincide with the branch instruction address registered on the single loop entry 13 (#54 No), the controller 12 updates the first correspondence information in the single loop entry 13 by use of the branch prediction address for which the branch has been taken and clears the counter 15 (#515). This is because that the non-coincidence between the branch instruction address for which the branch has been taken and the branch instruction address registered on the single loop entry 13 means that the instruction sequence computed by the computing unit 7 has been taken out of the loop resulted from the branch instruction registered on the single loop entry 13 and has gone into the loop resulted from, for example, a new branch instruction.

When the branch instruction address for which the branch has been taken coincides with the branch instruction address registered on the single loop entry 13 (#54 Yes), the controller 12 increments the count value of the counter 15 (#55).

The controller 12 of the branch prediction unit 1 makes a determination of whether the count value of the counter 15 exceeds the threshold value or not (#56). When the count value of the counter 15 does not exceed the threshold value (#56 No), the controller 12 maintains the current operation mode (#510). When the count value of the counter 15 exceeds the threshold value (#56 Yes), the controller 12 makes a determination of whether the operation mode of the branch prediction mechanism is placed in the normal operation mode or not (#57). When the operation mode of the branch prediction mechanism is not in the normal operation mode (#57 No), in other words, placed in the reduced power consumption mode, the controller 12 maintains the current operation mode (#510).

When the operation mode of the branch prediction mechanism is in the normal operation mode (#57 Yes), the controller 12 stops the supply of clocks being supplied to the branch history table 14 (#58). This causes the operation mode of the branch prediction mechanism to be switched to the reduced power consumption mode from the normal operation mode, and the branch predictor 11 of the branch prediction unit 1 executes the branch prediction processing not by use of the branch history table 14 but by use of the single loop entry 13 (#59).

When the branch control unit 8 determines that the branch prediction results in success (#52) and the branch is not taken (#511), the controller 12 maintains the current operation mode (#512).

When the branch control unit 8 determines that the branch prediction has resulted in failure, the controller 12 of the branch prediction unit 1 clears the counter 15 as will be disclosed below. This is because the failure of the branch prediction means that the instruction sequence, computed by the computing unit 7, has been taken out of the loop resulted from the branch instruction registered on the group entry 13 and the instruction sequence has gone into the loop resulted from, for example, a new branch instruction.

More specifically, when the branch control unit 8 determines that a branch prediction has resulted in failure (#513) and a branch is taken (#514), the controller 12 updates the first correspondence information in the single loop entry 13 by use of the branch instruction address, for which the branch is taken, clears the counter 15 (#515) and executes processing (#516) as will be disclosed below. When the branch control unit 8 determines that the branch prediction has resulted in failure (#513) and the branch is not taken (#517), the controller 12 clears the counter 15 (#518).

Thereafter, the controller 12 makes a determination of whether the current operation mode is placed in the normal operation mode or not (#516). When the current operation mode is placed in the normal operation mode (#516 Yes), the controller 12 maintains the current operation mode (#510). When the current operation mode is not placed in the normal operation mode (#516 No), in other words, placed in the reduced power consumption mode, the controller 12 supplies the branch history table 14 with the clocks the supply of which has been stopped (#519). This allows the operation mode of the branch prediction mechanism to be switched to the normal operation mode from the reduced power consumption mode, and the branch predictor 11 of the branch prediction unit 1 executes the branch prediction processing by use of the branch history table 14 (#520).

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An information processing apparatus, comprising:
a first branch history recording unit that stores only a single piece of first correspondence information that is correspondence information between an instruction address and a branch destination address of a most recent branch instruction, a computation of the most recent branch instruction having been completed and a branch for the most recent branch prediction having been taken;
a second branch history recording unit that stores a second correspondence information which is correspondence information between an instruction address and a branch destination address of each of a plurality of past branch instructions, which include the most recent branch instruction, computations of the plurality of past branch instructions having been completed and branches for the plurality of past branch instructions having been taken; and
a branch prediction control unit that makes a branch prediction, based on a result of a search for one of the first correspondence information stored in the first branch history recording unit and the second correspondence information stored in the second branch history recording unit, with use of an instruction address of an instruction fetched from a memory, and that stops supply of a clock to the second branch history recording unit and makes a branch prediction based on the result of the search for the first correspondence information in the first branch history recording unit when an instruction sequence enters a loop.

2. The information processing apparatus according to claim 1, wherein
the branch prediction control unit counts the number of coincidences between the instruction address of the branch instruction, the computation of which has been completed, and an instruction address included in the first correspondence information and, when a count value exceeds a threshold value, the branch prediction control unit determines that the instruction sequence in execution of the computation enters the loop.

3. The information processing apparatus according to claim 1, wherein
when the supply of the clock to the second branch history recording unit is being stopped, the branch prediction control unit makes a determination of whether the instruction sequence in execution of the computation enters the loop and supplies the clock, the supply of which has been stopped, to the second branch history recording unit in response to that the instruction sequence in execution of the computation does not enter the loop.

4. The information processing apparatus according to claim 3, wherein
the branch prediction control unit determines that the instruction sequence in execution of the computation does not enter the loop when the branch prediction has resulted in failure.

5. The information processing apparatus according to claim 3, wherein
the branch prediction control unit determines that the instruction sequence in execution of the computation does not enter the loop when the branch prediction results in success and a branch destination address included in the first correspondence information does not coincide with the branch destination address of the branch instruction, the computation of which has been completed.

6. A branch prediction method, comprising:
storing only a single piece of first correspondence information that is correspondence information between an instruction address and a branch destination address of a most recent branch instruction, in a first branch history recording unit, a computation of the most recent branch instruction having been completed and a branch for the most recent branch prediction having been taken;
storing a second correspondence information that is correspondence information between an instruction address and a branch destination address of each of a plurality of past branch instructions, which includes the most recent branch instruction, in a second branch history recording unit, computations of the plurality of past branch instructions having been completed and branches for the plurality of past branch instructions having been taken;
making a determination of whether an instruction sequence in execution of the computation enters a loop, by a branch prediction control unit which makes a branch prediction, with use of an instruction address of an instruction fetched from a memory, based on a result of a search for one of the first correspondence information in the first branch history recording unit and the second correspondence information in the second branch history recording unit; and
stopping supply of a clock to the second branch history recording unit and making the branch prediction by the branch prediction control unit, based on the result of the search for the first correspondence information in the first branch history recording unit when an instruction sequence in execution of the computation enters a loop.

7. The information processing apparatus according to claim 1, wherein
the first branch history recording unit includes one or more flip-flop circuits, a number of flip-flop circuits being equal to a number of bits of the single piece of first correspondence information.

* * * * *